United States Patent
Di Federico et al.

(10) Patent No.: US 10,330,795 B2
(45) Date of Patent: Jun. 25, 2019

(54) GNSS POSITIONING SYSTEM AND METHOD USING MULTIPLE PROCESSING THREADS

(71) Applicant: Topcon Positioning Systems, Inc., Livermore, CA (US)

(72) Inventors: Ivan Giovanni Di Federico, Argenta (IT); Lev Borisovich Rapoport, Moscow (RU)

(73) Assignee: Topcon Positioning Systems, Inc., Livermore, CA (US)

(*) Notice: Subject to any disclaimer, the term of this patent is extended or adjusted under 35 U.S.C. 154(b) by 452 days.

(21) Appl. No.: 15/317,270

(22) PCT Filed: Jul. 4, 2016

(86) PCT No.: PCT/RU2016/000417
§ 371 (c)(1),
(2) Date: Dec. 8, 2016

(87) PCT Pub. No.: WO2018/009088
PCT Pub. Date: Jan. 11, 2018

(65) Prior Publication Data
US 2018/0210091 A1    Jul. 26, 2018

(51) Int. Cl.
*G01S 19/44* (2010.01)
*G01S 19/42* (2010.01)
(Continued)

(52) U.S. Cl.
CPC .............. *G01S 19/44* (2013.01); *G01S 19/07* (2013.01); *G01S 19/32* (2013.01); *G01S 19/423* (2013.01); *G01S 19/426* (2013.01); *G01S 19/43* (2013.01)

(58) Field of Classification Search
CPC .......... G01S 19/44; G01S 19/40; G01S 19/07; G01S 19/43; G01S 19/32; G01S 19/425–19/426; G01S 19/55
See application file for complete search history.

(56) References Cited

U.S. PATENT DOCUMENTS

2005/0101248 A1    5/2005  Vollath
2008/0297408 A1*  12/2008  Dai ........................ G01S 19/44
                                              342/357.38
(Continued)

FOREIGN PATENT DOCUMENTS

WO    2012130252 A1    10/2012

OTHER PUBLICATIONS

W. R. Williamson et al., A GPS/INS Multiple Model Adaptive Kalman Filter for Carrier Phase Integer Ambiguity Resolution and Cycle Slip Detection, Proceedings of the 2000 National Technical Meeting of The Institute of Navigation, p. 115-124, Jan. 2000 (Year: 2000).*

(Continued)

*Primary Examiner* — Bernarr E Gregory
*Assistant Examiner* — Fred H Mull
(74) *Attorney, Agent, or Firm* — Bardmesser Law Group

(57) ABSTRACT

A plurality of GNSS satellite signals feeds multiple signal processing engines, each operating in certain processing mode including carrier smoothed pseudorange positioning, precise point positioning (PPP), pseudorange differential (DGNSS), carrier phase differential (RTK). Each processing engine (or processing thread of the same engine) runs the same unified numerical algorithm and uses the same or different sets of parameters. All engines can use the same set of signals, or the set of signals can be split into non-intersecting subsets, or the set of signals can be split into the overlapping subsets. Each engine produces estimates of (Continued)

certain parameters, namely carrier phase ambiguities and ionospheric delays for each satellite. These estimates are then combined into a resulting estimate which in turn is used for calculation of the final position reported by the receiver.

13 Claims, 2 Drawing Sheets

(51) Int. Cl.
*G01S 19/43* (2010.01)
*G01S 19/07* (2010.01)
*G01S 19/32* (2010.01)

(56) References Cited

U.S. PATENT DOCUMENTS

2010/0245168 A1* 9/2010 Rollet ............... G01S 19/40
 342/357.23
2016/0077214 A1 3/2016 Xianglin

OTHER PUBLICATIONS

Search Report in PCT/RU2016/000417, dated Jan. 30, 2017.

* cited by examiner

GNSS POSITIONING SYSTEM AND METHOD USING MULTIPLE PROCESSING THREADS

BACKGROUND OF THE INVENTION

Field of the Invention

The present invention relates to a satellite navigation systems, and, more particularly, to more accurate determination of phase ambiguity in satellite navigation signals using multiple processing threads.

Description of the Related Art

Assume that the receiver is capable of receiving multiple GNSS signals of multiple GNSS satellites, including (but not limited by this set)
GPS L1, L2, L5;
Galileo L1, L2, E5a, E5b;
QZSS L1, L2, L5, E6;
GLONASS L1, L2, L3;
BEIDOU B1, B2, B3.
The number of such signals can exceed several dozen. The following fundamental set of observables is used:

$$P_{k,b}^p(t) = \rho_k^p(t) + cdt_k(t) - cdt^p(t) + \left(\frac{f_{L1}^p}{f_b^p}\right)^2 I_{k,L1}^p(t) + T_k^p(t) + d_{k,b,P} + M_{k,b,P}^p - D_{b,P}^p + \varepsilon_{k,b,P}^p(t) \quad (1)$$

$$\varphi_{k,b}^p(t) = \frac{f_b^p}{c}\rho_k^p(t) + f_b^p dt_k(t) - f_b^p dt^p(t) + N_{k,b}^p(t_{CS,k,b}^p) - \frac{1}{c}\frac{(f_{L1}^p)^2}{f_b^p} I_{k,L1}^p(t) + \frac{f_b^p}{c}T_k^p(t) + d_{k,b,\varphi} + M_{k,b,\varphi}^p - D_{b,\varphi}^p + \varepsilon_{k,b,\varphi}^p \quad (2)$$

where the following notations are used (see [1, Chapter 6, 7]):
k is the index of the station;
p is the number of the satellite (out of K total satellites from which signals are received). It is assumed that all satellites available for tracking in the receiver station k are ordered and this ordering number includes the satellite system. For example, satellites with numbers from 1 to 5 are GPS, satellites with numbers from 6 to 11 are GLONASS, satellites with numbers from 12 to 15 are BEIDOU, etc.;
b is the frequency band (for example L1, LP2, L2C, L5, E6, B1, and so on);
(p,b) the pair of indices indicating the signal of the satellite p at the frequency band b;
t is the current time; the term 'epoch' is also used to denote the current discrete time instant;
c is the light speed;
$f_b^p$ is the frequency of the signal corresponding to the satellite p and the frequency band b
$dt_k(t)$ is the current clock bias of the station k;
$dt^p(t)$ is the current clock bias of the satellite p;
$I_{k,b}^p(t)$ is the ionospheric delay affecting the signal (p, b) received by the station k. Thus $I_{k,L1}^p(t)$ is related to the L1 band. Basically, the ionospheric delay depends on the position of the station, position of the satellite, frequency of the signal, and the total electronic content (TEC) corresponding to the time instant t;

$T_k^p(t)$ is the tropospheric delay. In contrast to the ionospheric delay it doesn't depend on the signal frequency and is called 'non-dispersive' delay.

$P_{k,b}^p(t)$ and $\varphi_{k,b}^p(t)$ are pseudorange and phase measurements respectively;

$M_{k,b,P}^p$ and $M_{k,b,\varphi}^p$ are code and phase multipath, affecting pseudorange and carrier phase measurements respectively;

$N_{k,b}^p(t_{CS,k,b}^p)$ carrier phase ambiguity corresponding to the signal (p,b) received by the station k. Note that it corresponds to the last detected cycle slip and therefore it explicitly dependents on the time instant $t_{CS,k,b}^p$, when the cycle slip was detected. The carrier phase ambiguity remains unchanged until the cycle slip occurs.

$\rho_k^p(t)$ is the true topocentric range between the satellite and the receiver station. The measurement equations (1) and (2) relate this quantity with pseudorange and carrier phase observables, respectively;

Quantities $D_{b,\varphi}^p$, $D_{b,P}^p$, $\varepsilon_{k,b,P}^p(t)$ and $\varepsilon_{k,b,\varphi}^p$ denote hardware biases and noise. D stands for satellite-related bias, while d denotes the receiver-related bias. Biases reflect a systematic hardware component of the measurement error. They are constant or slow varying, in contrast to the noise component of the error having the stochastic nature. Satellite position error is part of the slow varying bias. It is also called 'the ephemerides' error.

Thus, the receiver position is measured by the pseudorange and carrier phase observables for the plurality of satellites. Error components, including biases and noise, affecting the observable equations (1) and (2), prevent a direct solution for the receiver antenna position.

Carrier phase measurements are much more precise, compared to the pseudorange measurements, since the carrier phase noise has standard deviation in the centimeter or even millimeter range, while the standard deviation of the pseudorange measurements is usually of the meter or decimeter range. On the other hand, the carrier phase measurement is affected by the carrier phase ambiguity, which is an unknown integer valued quantity.

Thus, elimination of measurement errors is necessary for precise positioning. To achieve a high precision in position determination, different methods of errors mitigation are applied. For example, tropospheric errors can be precisely modeled and compensated in observables of equations (1) and (2). Ionospheric errors can be estimated along with other unknowns. Noise is easily filtered.

Errors common to two receivers, like clock and hardware biases of the satellite, can be compensated in a difference between two receivers. Usually one of receivers occupies a known position, while an antenna of another receiver is attached to the object to be located. The first receiver is called 'the base' while another receiver is called 'the rover'. The processing mode involving calculation of the across-receiver difference (also called the 'first difference') is referred to as differential GNSS processing or DGNSS. The DGNSS processing is performed in real time and includes not only pseudoranges but also carrier phase observables, and is referred to as real time kinematic (RTK) processing.

Another sources of errors partially eliminated by across-receiver differences are ionospheric delay and ephemerides error. The closer the rover is to the base, the better is compensation of the ionospheric and ephemerides error.

For two stations k and l the across-receiver differences of pseudorange and carrier phase measurements can be written as $$\overline{P}_{kl,b}^p(t) = \rho_k^p(t) - \rho_l^p(t) + cdt_{kl}(t) + \left(\frac{f_{L1}^p}{f_b^p}\right)^2 I_{kl,L1}^p(t) + d_{kl,b,P} + \overline{\varepsilon}_{kl,b,P}^p(t), \quad (3)$$

$$\overline{\varphi}_{kl,b}^p(t) = \frac{1}{\lambda_b^p}(\rho_k^p(t) - \rho_l^p(t)) + f_b^p dt_{kl}(t) + \quad (4)$$

$$N_{kl,b}^p(t_{CS,kl,b}^p) - \frac{1}{\lambda_b^p}\left(\frac{f_{L1}^p}{f_b^p}\right)^2 I_{kl,L1}^p(t) + d_{kl,b,\varphi}^p + \overline{\varepsilon}_{kl,b,\varphi}^p,$$

Another way for error mitigation includes using a precise satellites clock and precise ephemerides. They are available through a dedicated real time service. Precise point positioning (PPP) allows to achieve the centimeter level position with only one rover receiver, provided satellite clock and precise satellite position are available. The base station is not necessary in this case.

Finally, if neither base station, nor precise clock and ephemerides are available, the quality of the standalone position can be improved if carrier phase ambiguity and ionospheric delay are estimated, along with position, using broadcast ephemerides. The corresponding processing mode is equivalent smoothing of pseudoranges using carrier phase measurements or, in short, carrier phase smoothing of code pseudoranges, see [2]. Whatever processing mode is used, the linearization and filtering algorithms are used for recursive estimation of unknown position, carrier phase ambiguity, and ionospheric delay.

Two last quantities are undifferences for carrier phase smoothing and PPP processing modes. For DGNSS and RTK processing modes the carrier phase ambiguity and ionospheric delay are across-receiver differenced. The general form of the linearized navigation model has the following form (see [1, Chapt. 7])

$$b_P(t) = Adx(t) + e\xi(t) + \Gamma i(t) + d_P \quad (5)$$

$$b_\varphi(t) = \Lambda^{-1}Adx(t) + \Lambda^{-1}e\xi(t) + n - \Lambda^{-1}\Gamma i(t) + d_\varphi \quad (6)$$

Let n be total number of satellite signals, including different satellite systems, different satellites, different frequency bands.

In the following description, all vectors are represented by columns, and the superscript symbol $^T$ denotes the matrix transpose. $R^N$ is the N-dimensional Euclidean space. Given a linearization point $x_0(t) \in R^3$, notations used in equations (5) and (6) are as follows:

$b_P(t) \in R^n$ is the n-dimensional vector of pseudorange residuals calculated at the linearization point;

$b_\varphi(t) \in R^n$ is the n-dimensional vector of carrier phase residuals calculated at the linearization point;

$e = (1, 1, \ldots, 1)^T \in R^n$ is the vector consisting of all "ones";

$dx(t) \in R^3$ is the correction to the linearization point. Thus, the corrected position is calculated as $x(t) = x_0(t) + dx(t)$;

$\xi(t)$ is the arbitrary varying rover clock shift; it is undifferenced for the standalone and PPP processing modes, and it is across-receiver differenced in the DGNSS and RTK processing modes;

$\Lambda$ is the n-dimensional diagonal matrix with wavelengths $\lambda_b^p = c/f_b^p$ in the main diagonal. Each wavelength corresponds to the specific signal (p,b);

A is the n×3 matrix of directional cosines;

$\Gamma$ is the n×n diagonal matrix with quantities $(f_{L1}^p/f_b^p)^2$ in the main diagonal;

$i(t) \in R^n$ is the vector of ionospheric delays related to the L1 frequency band. Ionospheric delays are undifferenced for the standalone and PPP processing modes, and they are across-receiver differenced in the DGNSS and RTK processing modes;

$n \in R^n$ is the vector of carrier phase ambiguities related to the L1 frequency band. Ambiguities are undifferenced for the standalone and PPP processing modes, and they are across-receiver differenced in the DGNSS and RTK processing modes;

$d_P \in R^n$ and $d_\varphi \in R^n$ are vectors of pseudorange and carrier phase receiver hardware biases.

Consideration of pseudorange hardware biases leads to a necessity to consider the plurality of signals the receiver is able to track. In the case of a multi-frequency and multi-system receiver supporting the following bands:

L1, L2 and L5 bands for GPS,
L1 and L2 GLONASS,
L1, E5a, E5b and E6 Galileo,
L1, L2, L5 and E6 QZSS,
L1 an, L5 SBAS,
B1, B2, and B3 Beidou, the signals (L1 GPS, L1 Galileo, L1 SBAS, L1 QZSS), (L2 GPS, L2 QZSS), (L5 GPS, E5a Galileo, L5 SBAS, L5 QZSS), (E6 Galileo, E6 QZSS), respectively, can share the same hardware channel and therefore will be affected by the same hardware bias, as noted in [1, Chapt. 7]. Note that the biases vector $d_P$ and the clock shift variable $\xi(t)$ appear as a sum in equation (5). This means that one of the biases, say $d_{L_1,G/E/S/Q,P}$, can be combined with $\xi(t)$, while others can be replaced with their difference with $d_{L_1,G/E/S/Q,P}$. Thus, new bias variables appear:

$$\eta_1 = d_{L_2,G/Q,P} - d_{L_1,G/E/S/Q,P}, \eta_2 = d_{L_1,R,P} - d_{L_1,G/E/S/Q,P},$$
$$\eta_3 = d_{L_2,R,P} - d_{L_1,G/E/S/Q,P}, \eta_4 = d_{L_5,G/E/S/Q,P} - d_{L_1,G/E/}$$
$$S/Q,P, \eta_5 = d_{E_{5b},E,P} - d_{L_1,G/E/S/Q,P}, \eta_6 = d_{E_6,E/Q,P} - d_{L_1,}$$
$$G/E/S/Q,P, \eta_7 = d_{B_1,B,P} - d_{L_1,G/E/S/Q,P}, \eta_8 = d_{B_2,B,P} - d_{L_1,}$$
$$G/E/S/Q,P, \eta_9 = d_{B_3,B,P} - d_{L_1,G/E/S/Q,P} \quad (7)$$

This representation can be referred to as establishing a bias datum.

In one possible embodiment, the linearized equations (5) can now be expressed in the form $$b_P(t) = Adx(t) + e\xi(t) + \Gamma i(t) + W_\eta \eta \quad (8)$$

The bias vector $\eta$ has the appropriate dimension $m_\eta$. Note again that in this exemplary embodiment we follow notations introduced in [1], which is incorporated herein by reference in its entirety.

The bias vector $\eta$ is three-dimensional ($m_\eta = 3$) for dual-band and dual-system GPS/GLONASS receivers, as only biases $\eta_1$, $\eta_2$, $\eta_3$ are presented among all possible biases listed in (7). In the case of the multi-band, multi-system receiver, the dimension of the vector $\eta$ can be large. It is one-dimensional in the case of dual-band GPS-only receivers or single band GPS/GLONASS receivers.

The $W_\eta$ is referred to as bias allocation matrix and has dimensions n×$m_\eta$. It allocates a single bias, or none, to a certain signal. No bias is allocated to the signal corresponding to the GPS, Galileo, SBAS, or QZSS systems and b=L1 because we combined the bias $d_{L_1,G/E/S/Q,P}$ with the clock bias $\xi(t)$. In this case, the row of $W_\eta$ consists of zeroes.

Consider, for example, a dual-band GPS/GLONASS receiver. Suppose it tracks six GPS satellites and six GLONASS satellites. The total number of dual-band signals is 24. Let the signals be ordered in the following way: six GPS L1, six GPS L2, six GLONASS L1, and six GLONASS L2 signals. The biases allocation matrix presented in the linearized single difference pseudorange equation (8) takes the following form:

$$W_\eta^T = \begin{bmatrix} 0 & 0 & & 0 & 1 & 1 & & 1 & 0 & 0 & & 0 & 0 & 0 & & 0 \\ 0 & 0 & \vdots & 0 & 0 & 0 & \vdots & 0 & 1 & 1 & \vdots & 1 & 0 & 0 & \vdots & 0 \\ 0 & 0 & & 0 & 0 & 0 & & 0 & 0 & 0 & & 0 & 1 & 1 & & 1 \end{bmatrix} \quad (9)$$

Further, the real-valued carrier phase ambiguities (also called float ambiguities) are combined with biases $d_\varphi$, while pseudorange biases are considered as a real valued constant unknown parameter. Thus, after combination of carrier phase ambiguities with carrier phase biases, the equation (6) takes the form $$b_\varphi(t) = \Lambda^{-1} A dx(t) + \Lambda^{-1} e \xi(t) + n - \Lambda^{-1} \Gamma i(t) \quad (10)$$

Note that the noise component is omitted in equations (8), (10) for the sake of brevity.

Accordingly, there is a need in the art for a more accurate determination of phase to, thereby, enable more accurate determination of position.

SUMMARY OF THE INVENTION

Accordingly, the present invention is directed to a plurality of GNSS satellite signal feeds to multiple signal processing engines, with each operating in a specific processing mode, such as carrier smoothed pseudorange positioning, precise point positioning (PPP), pseudorange differential (DGNSS), and carrier phase differential (RTK). Each processing engine (or processing thread of the same engine) runs the same numerical algorithm and uses the same or different sets of parameters. All engines can use the same set of signals, or the set of signals can be split into non-intersecting subsets, or the set of signals can be split into the overlapping subsets. Each engine produces estimates of certain parameters, namely carrier phase ambiguities and ionospheric delays for each satellite. These estimates are then combined into resulting estimate which in turn is used for calculation of the final position reported by the receiver.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
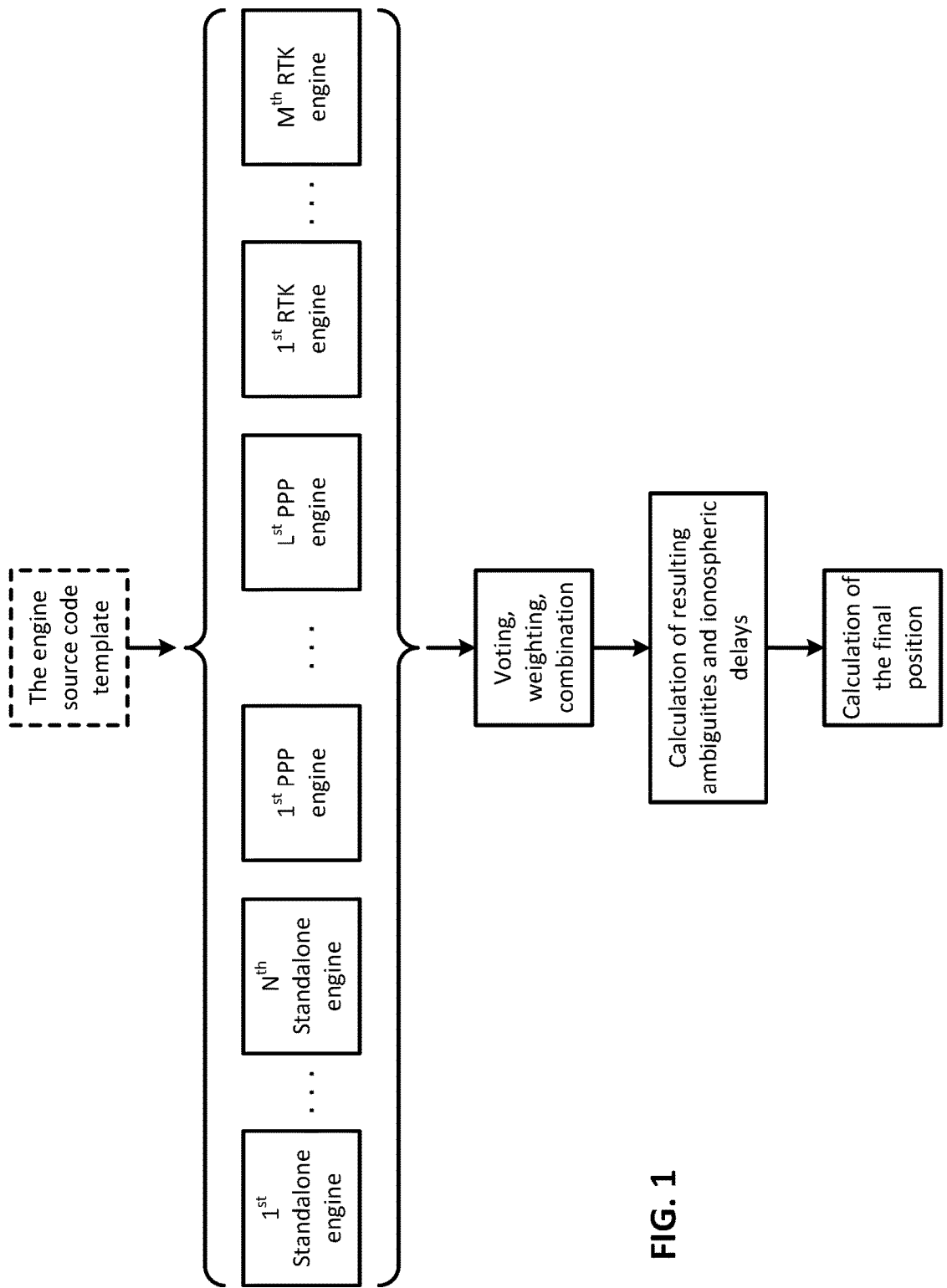
FIG. 1 illustrates multiple instances of the unified numerical scheme (the engine template).

Reference will now be made in detail to the embodiments of the present invention, examples of which are illustrated in the accompanying drawings.

Thus, equations (8) and (10) above are the basis for construction of the unified numerical scheme covering the following processing modes:

Standalone with carrier phase smoothing of pseudoranges,

PPP,

DGNSS,

RTK.

As explained, different processing modes use the same set of equations presented in the generalized form. Therefore, the general purpose unified numerical scheme of the processing engine can be used. Each processing mode is thus performed by the certain embodiment of the same processing engine. The same source code, such as a C++ source code template in one embodiment, can be used to generate multiple processing threads working in parallel. We call them threads, since they can be implemented as parallel processing threads being governed by an appropriate operating system, such as LINUX, RTEMS, or eCos.

Each processing mode can be presented by one or more multiple threads, running the same algorithm with different parameters sets reflecting different assumptions about errors to be modeled or different statistic assumptions about stochastic noise component of the error. Implementation of this idea as it applies to only RTK is the subject of the patent [3]. In the present discussion, we explore a more general idea using multiple threads for support of all possible processing modes (and not only RTK) and describe more general voting procedure allowing to combine phase ambiguities and ionosphere delay estimates produced by different threads, not just final RTK positions produced by different threads. This allows for deeper and tighter integration of results produced by different parallel threads. It also allows for seamless transition between processing modes, i.e., standalone, PPP, DGNSS, RTK float, and RTK fixed.

Following the idea of using the generalize processing scheme, all unknowns are grouped into following groups:

Arbitrary varying variables $dx(t)$ and $\xi(t)$,

Slow varying variables subjected to certain dynamic model $i(t)$,

Constant (time invariant) variables $n$ and $\eta$.

To estimate all three groups of variables in real time, the recursive estimator must be applied. It can be implemented as a sort of Kalman filter, particle filter, another recursive estimator which is convenient for the real time implementation. In one exemplary embodiment, the general purpose processing thread can run the recursive estimator described in [1, Chapt. 3.5].

To specify dynamic model that governs variation of $i(t)$ let us suppose that the vector $i(t)$ is restricted by equations $$i^p(t) = \gamma_i i^p(t-1) + \varepsilon_i(t) \quad (11)$$

where $$\gamma_i = e^{-\frac{\Delta t}{\tau_i}} \quad (12)$$

with $\Delta t$ being the across-epoch time difference, and $\tau_i$ is the correlation time reflecting the rate of variation of the ionospheric delay in time. A typical value for $\tau_i$ is 600 seconds, provided no ionospheric scintillations happened. Otherwise, if detection criteria (not described here) signal a presence of fast variation of ionosphere, the instant value of $\tau_i$ can be temporary scaled down until the fast variations end.

The white noise $\varepsilon_i(t)$ has a variance $\sigma_i^2$, which provides the variance of the across-receiver ionosphere satisfying the condition $$|i^P(t)| \approx s \times 10^{-6} \times \|\text{baseline}\| \quad (13)$$

with a certain scale factor s, which takes values 1 to 5, depending on the current solar activity. It follows from (11) that $\|i^P(t)\|^2 = \|\gamma_i i^P(t-1) + \varepsilon_i(t)\|^2$. Then, assuming that the stochastic process $i^P(t)$ is stationary and $i^P(t)$ does not depend on $\varepsilon_i(t)$, we take a mean value of both sides of the last equality. We obtain $$\sigma_i^2 = (1-\gamma_i^2) \times (s \times 10^{-6} \times \|\text{baseline}\|)^2 \quad (14)$$

Let us define the measurement and dynamic models. The measurement model combines equations (8) and (10).

The group of constant variables n and η form the vector $$y = \begin{pmatrix} \eta \\ n \end{pmatrix} \quad (15)$$

The group of arbitrary varying variables dx(t) and ξ(t) form the vector $$\overline{x}(t) = \begin{pmatrix} dx(t) \\ \xi(t) \end{pmatrix} \quad (16)$$

Then the algorithm described in [1, Table 3.5.1] can be applied.

Definition of Multiple Processing Threads

The same general purpose numerical scheme or the engine template is used to generate multiple instances as shown in FIG. 1. In this exemplary implementation, several Standalone, several PPP and several RTK engines are implemented.

Each engine (indexed by the variable j ranging from 1 to m) calculates its own vector of carrier phase ambiguities $n_j$ and its own vector of ionospheric delays estimate $i_j(t)$. Each estimate is accompanied by its covariance matrix $C_{n_j}$ and $C_{i_j}$ respectively. The resulting ambiguity and ionospheric delay vectors can be calculated in the following two ways:

A. Having covariance matrices $C_{n_j}$ and $C_{i_j}$ we select the thread corresponding to the minimum quantity $\text{tr}(C_{n_j}) + \text{tr}(C_{i_j})$ where $\text{tr}(\cdot)$ denotes the trace of the matrix.

B. Weighted estimates are calculated according to the formulas $$n = \left( \sum_{j=1}^{m} C_{n_j}^{-1} \right)^{-1} \sum_{j=1}^{m} C_{n_j}^{-1} n_j \quad (17)$$

$$i(t) = \left( \sum_{j=1}^{m} C_{i_j}^{-1} \right)^{-1} \sum_{j=1}^{m} C_{i_j}^{-1} i_j(t) \quad (18)$$

Estimates of the vectors n and i(t) produced in the way A or B according to (17) and (18) are then substituted into the equation (10), which is finally solved for time-varying variables $$\overline{x}(t) = \begin{pmatrix} dx(t) \\ \xi(t) \end{pmatrix}$$

using minimization of least squares, according to the expression $$\overline{x}(t) = \overline{A}^+ (b_\varphi(t) - n + \Lambda^{-1} \Gamma i(t)) \quad (19)$$

$$\overline{A} = \Lambda^{-1}[A|e] \quad (20)$$

where the symbol $\overline{A}^+$ denotes the matrix pseudoinverse.

Using different sets of signals in the processing threads and using different sets of the processing parameters allows introduction of randomization into the set of a priori hypotheses placed into the measurement models, which in turn allows for faster ambiguity resolution and better averaging of the measurement errors.

Computational Complexity

The computational complexity of the processing thread can be roughly estimated as $$T_1 = Cn^3 \quad (21)$$

where C is a constant specific to the certain processing algorithm and n is number of signals. This estimate follows from the fact that most complex part of the numerical scheme is the matrix inverse of Cholesky factorization, or another factorization.

If all threads use the same set of signals, then the overall computational cost is estimated as $$T_m = mT_1 \quad (22)$$

Assume now that the set of n signals is divide into m threads. The resulting complexity can then be estimated as $$T_m^{n/m} = mC\left(\frac{n}{m}\right)^3 = \frac{Cn^3}{m^2} = \frac{T_1}{m^2} \quad (23)$$

which means that the computational complexity can be even reduced if the set of signals is appropriately distributed among processing threads.

In a general case, the set of signals is not necessarily split into m not intersecting subsets. Instead, subsets can overlap. Thus, resulting computational cost T can be estimated as $$\frac{T_1}{m^2} \leq \overline{T} \leq mT_1 \quad (24)$$

As a further option, each engine thread can use different settings of parameters, even if they run the same processing mode. Also, each engine thread can use different sets of signals. The processing threads can use different a priori assumptions and hypotheses about:

a) state of the ionosphere
b) level of the local multipath conditions
c) level of the measurement noise The voting procedure judges which assumption is likely true. Alternatively, a weighting procedure aggregates all or some of the assumptions.

Figure 2:
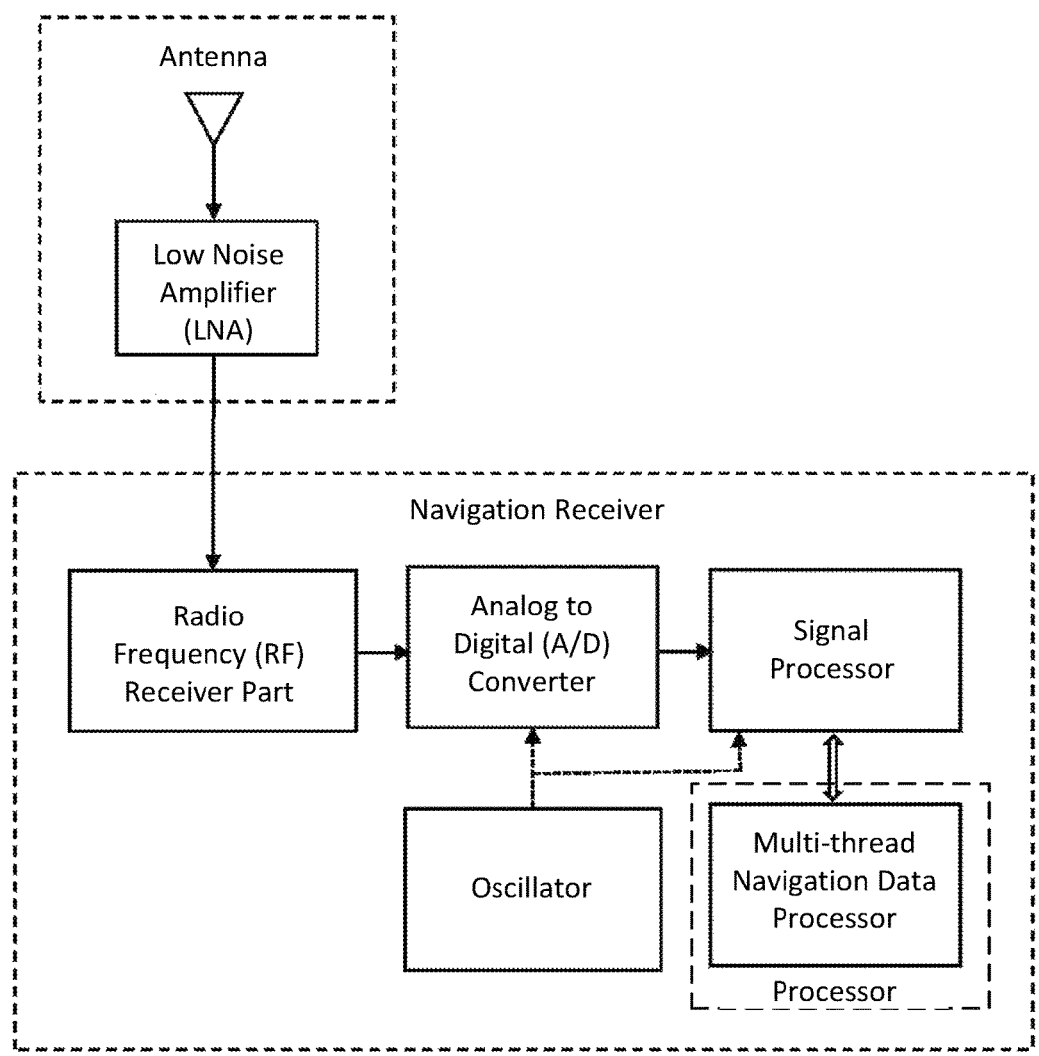
FIG. 2 illustrates an exemplary navigation receiver on which the invention may be implemented.

FIG. 2 illustrates an exemplary navigation receiver on which the invention may be implemented. As will be appreciated by one of ordinary skill in the art, the various blocks shown in FIGS. 1-2 can be implemented as discrete components, as an ASIC (or multiple ASICs) and/or as software running on a processor.

Having thus described the different embodiments of a system and method, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

REFERENCES (INCORPORATED HEREIN BY REFERENCE IN THEIR ENTIRETY)

1. A. Leick, L. Rapoport, D. Tatarnikov, GPS Satellite Surveying, Wiley & Sons, 2015.
2. R. Hatch, *The synergism of GPS code and carrier measurements*, Proceedings of International Geodetic Symposium on Satellite Doppler Positioning, 3rd, Las Cruces, N. Mex., Feb. 8-12, 1982, Proceedings. Volume 2 (A84-18251 06-42), Las Cruces, N. Mex., New Mexico State University, 1983, pp. 1213-1231.
3. J. Ashjaee, L. Rapoport, *GNSS surveying receiver with multiple RTK engines, U.S. Pat. No.* 8,872,700, issued Oct. 28, 2014.

What is claimed is:

1. A satellite navigation positioning method, comprising:
   receiving n navigation signals from K navigation satellites, wherein the n navigation signals are on at least two different carrier frequencies, and wherein n is at least 8 and K is at least 4;
   on a processor of a navigation receiver, executing m processing threads, each processing thread running one instance of a processing engine,
   wherein each processing engine processes at least 8 out of the n navigation signals from at least 4 satellites;
   for each processing engine, generating a phase ambiguity vector and an ionospheric delay vector;
   selecting one phase ambiguity vector and one ionospheric delay vector out of all the vectors generated by the processing engines; and
   calculating a position based on the selected phase ambiguity vector and the selected ionospheric delay vector.

2. The method of claim 1, wherein the at least two different carrier frequencies are selected from GPS L1, GPS L2, GPS L5, Galileo L1, Galileo L2, Galileo E5a, Galileo E5b, QZSS L1, QZSS L2, QZSS L5, QZSS E6, GLONASS L1, GLONASS L2, GLONASS L3, BEIDOU B1, BEIDOU B2 and BEIDOU B3.

3. The method of claim 1, wherein each processing engine executes in a processing mode one of standalone carrier phase pseudorange smoothing, PPP, DGNSS and RTK, and wherein at least two out of standalone carrier phase pseudorange smoothing, PPP, DGNSS, and RTK are executed on the processing engines.

4. The method of claim 3, wherein each processing engine is running the same unified numerical scheme independently of its processing mode.

5. The method of claim 1, wherein the vectors are selected based on voting on a best vector.

6. The method of claim 1, wherein the vectors are selected based on a weighted average of multiple vectors.

7. The method of claim 1, wherein $m<n$.

8. The method of claim 1, wherein $m>n$.

9. The method of claim 1, wherein $m=n$.

10. The method of claim 1, wherein at least some of the processing engines use different assumptions and hypotheses about any of:
    a) state of an ionosphere,
    b) level of local multipath conditions, and
    c) level of the measurement noise.

11. The method of claim 10, wherein the vectors are selected based on voting on a best vector based on which assumption is likely true.

12. The method of claim 10, wherein the vectors are selected based on a weighting procedure that aggregates all or some of the assumptions.

13. A system for determining coordinates based on satellite navigation signals, the system comprising:
    an antenna configured to receive n navigation signals from K navigation satellites, wherein the n navigation signals are on at least two different carrier frequencies, and wherein n is at least 8 and K is at least 4;
    a receiver including a processor, the processor configured to execute m processing threads, each processing thread running one instance of a processing engine,
    wherein each processing engine is configured to process at least 8 out of the n navigation signals from at least 4 satellites;
    for each processing engine, the processor configured to generate a phase ambiguity vector and an ionospheric delay vector;
    the processor configured to select one phase ambiguity vector and one ionospheric delay vector out of all the vectors generated by the processing engines; and
    the processor configured to calculate a position based on the selected phase ambiguity vector and the selected ionospheric delay vector and providing an output corresponding to the position.

* * * * *